Patented Feb. 11, 1947

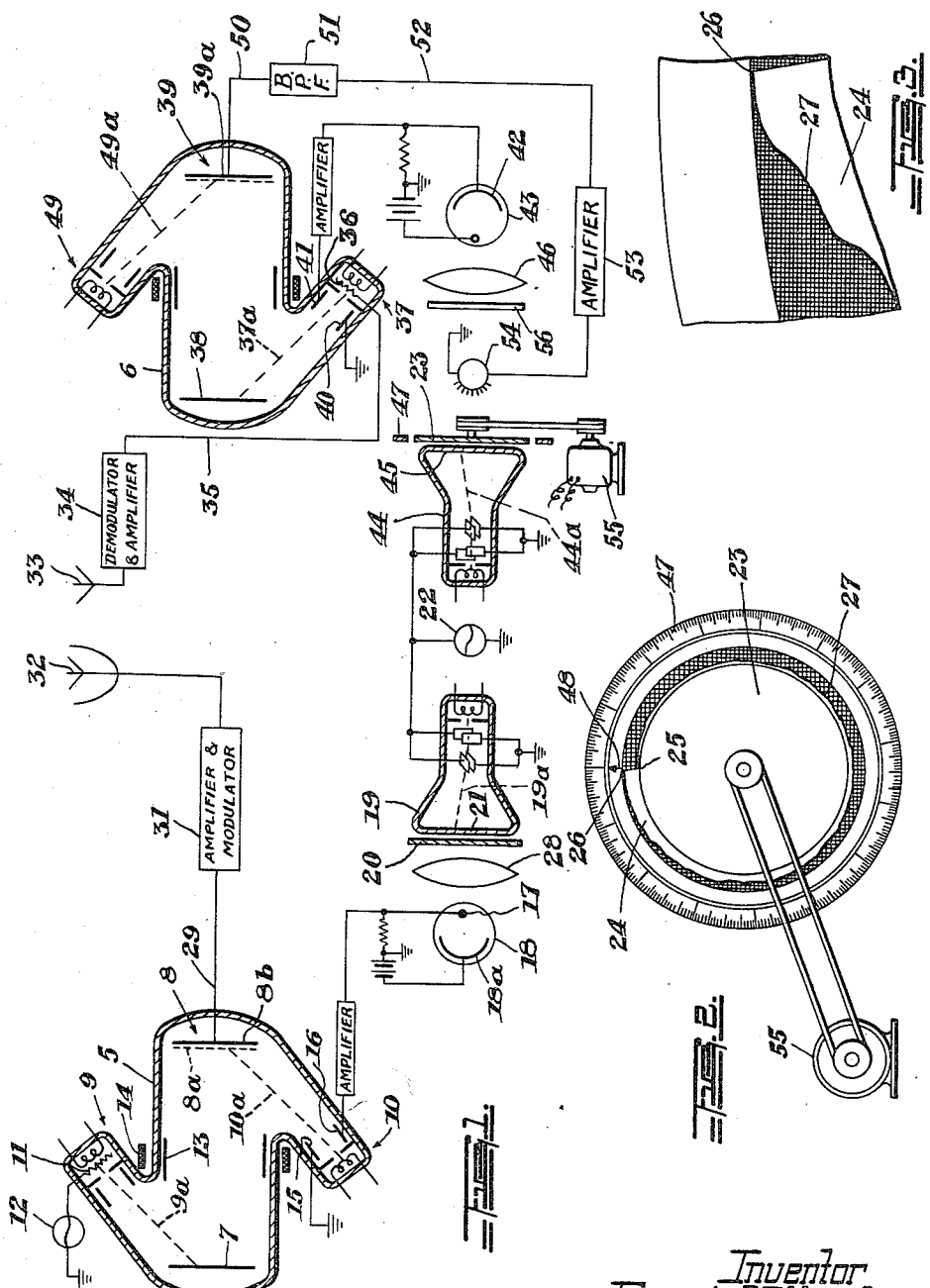

2,415,591

UNITED STATES PATENT OFFICE 2,415,591

METHOD AND APPARATUS FOR MEASURING DISTANCE

François Charles Pierre Henroteau, Ottawa, Ontario, Canada

Application May 4, 1942, Serial No. 441,700

11 Claims. (Cl. 250—168)

This invention relates to a method and apparatus for measuring the distance from a given point to some given object, and more particularly to range finding for anti-aircraft use.

Various methods for distance measurement based on the reflection of sound waves or electric waves have been proposed. Sound waves are unsuitable for various reasons, principally their limited range, and the methods using electrical waves which have been proposed have had various drawbacks. One of the most recent of such methods, designed particularly for the determination of the actual height above ground level by aircraft, consists in emitting from the aircraft an electric wave the frequency of which periodically increases and then decreases at a regular rate, and beating the outgoing wave with the reflected wave to obtain a resultant wave the frequency of which varies according to the distance of the aircraft from the ground from which the emitted wave was reflected. The principal disadvantage of this method is that it is difficult with known frequency meters to obtain rapidly an exact measurement of the frequency of the resultant wave, and accordingly difficult to obtain rapidly an exact measurement of the distance. There is, moreover, a further disadvantage in connection with the application of this method to the determination from a given point on the ground of the distance of the aircraft from that point. If two or more aircraft are in the path of the emitted wave and the latter is not wholly reflected by the nearest of these, but partly by one and partly by another, then there will be not one but a number of reflected waves, so that upon beating these with the outgoing wave a resultant wave will be obtained representative not of the distance of any one of the aircraft from the point in question on the ground, but representative of the mean distance of all the aircraft from which the emitted wave was reflected. It is quite obvious that for the purpose of directing anti-aircraft fire such a result might be of little use. If two aircraft were, say, 1000 feet apart in the path of the emitted wave, anti-aircraft fire directed at a point halfway between them might do very little damage to either.

According to the present invention these disadvantages of the prior method are avoided and a method is provided whereby an accurate indication may be obtained of the distance of each of one or more given objects, for example aircraft, toward which an electric wave is directed from a given point.

The method of the invention consists broadly in varying the frequency of an electric wave of constant frequency according to a periodically repeated pattern, modulating a carrier wave of a type adapted to be reflected by the object, for instance an ultra short wave, with the wave of variable frequency, emitting the modulated carrier wave from the point from which the measurement is to be taken, receiving at this point the wave reflected by the object, demodulating the reflected carrier wave, varying the frequency of the received wave of variable frequency according to a repeated pattern the reverse of the first pattern but having the same period of repetition, shifting the incidence on the received wave of the reverse pattern until the wave of constant frequency is reconstituted, and measuring the shift from the incidence appropriate for a distance of zero from the point to the object.

The invention will be described in more detail by reference to the accompanying drawing which shows one form of apparatus suitable for carrying the method into effect.

In the drawing,

Figure 1 is a diagrammatic illustration of the apparatus and its electrical connections.

Figure 2 is a face view of a key plate and scale used in the apparatus of Fig. 1, and Figure 3 is a detail on an enlarged scale of part of the key plate shown in Fig. 2.

The apparatus illustrated comprises what may be termed an emitting tube 5 and a receiving tube 6. The emitting tube contains a plate 7 of material capable of emitting electrons and a mosaic 8, the term "mosaic" wherever used in this specification meaning a device of the general type used in television apparatus such as the "iconoscope" and composed of a multiplicity of mutually insulated tiny conductive electron emissive but not necessarily photosensitive elements (represented by the dotted line 8a) mounted on and insulated from a signal plate (represented by the solid line 8b). Associated with the plate 7 is an electron gun 9 and associated with the mosaic 8 is an electron gun 10, each gun being contained in an appropriate pocket in the tube 5. For purposes of simplicity each gun is shown as provided with one pair of deflecting plates so that the electron beams 9a and 10a scan the plate 7 and mosaic 8 respectively along a single line only. For the purpose of modulating the intensity of the electron beam 9a, a modulating electrode 11 is associated with the gun 9 and is connected to an appropriate oscillator 12 for producing an electric wave of constant frequency. The beam 9a, with its intensity thus varying at a constant frequency, scans the plate 7 at a regular rate and causes the emission from the latter of electrons, which are directed towards and focused on the mosaic 8 by an accelerating electrode 13 and focusing coil 14. The action of these electrons on the mosaic produces in the manner well understood and electrostatic record of the variations of intensity of the beam 9a and therefore a record of the wave produced by the oscillator 12.

The electron beam 10a, unlike the beam 9a, is of constant intensity but, on the other hand, scans the mosaic 8 at an irregular rate of speed. In the drawing, one of the deflecting plates 15 for it is shown as grounded and the other plate 16 is connected through an amplifier to the anode 17 of a photoelectric cell 18. When no current passes in this cell the arrangement is such that the beam 10a strikes the lower end of the mosiac 8.

It will be seen, however, that when light falls upon the cathode 18a of the cell, the anode 17 will receive electrons and become more negative, so that the plate 16 will assume a negative potential and the beam 10a will be caused to move towards the upper end of the mosaic 8. The amount of light falling on the cathode 18a is caused to vary in accordance with a periodically repeated pattern by means of a cathode ray oscillograph 19 and a key plate 20. The cathode ray oscillograph is provided with a fluorescent coating 21 over which a beam of electrons 19a is caused to move in a circular path in any suitable way such as by connecting one deflecting plate of each pair of such plates to ground and the other plate of each pair to an appropriate source 22 of alternating potential. No special face view of the plate 20 is shown because Figure 2 shows a face view of another plate 23 identical with the plate 20 and referred to hereinafter. Each of the plates 20 and 23 has on it a circular path 24 corresponding in size to the circular path described by the luminous spot produced by movement of the electron beam 19a over the fluorescent coating 21. The translucency of this path increases constantly, though at an irregular rate, from the point 25 where it is at a minimum to the point 26 just short of 360° around the circle where it is at a maximum, and then decreases suddenly to the minimum again. In the key illustrated the line 27 represents the boundary between the opaque portion of the path and the translucent portion, the irregularity of this line being shown in Fig. 3 in somewhat more detail than is possible in Fig. 2.

A lens 28 is provided to focus on the cathode 18a any light which passes through the key plate 20. The result of the operation of the cathode ray oscillograph is that the amount of light falling on the cathode 18a of the photoelectric cell 18 constantly increases at an irregular rate in the time which it takes for the luminous spot on the fluorescent coating 21 to make a complete circuit of the path 24. The apparatus is so arranged that the maximum light falling on the cathode 17 is sufficient to bring the deflecting plate 16 to such a potential as to direct the electrom beam 10a at the upper edge of the mosaic 8. The sudden decrease in the amount of light falling on the cathode 18a when the luminous spot passes from a point opposite the point 26 to one opposite the point 25 causes a sudden reduction in the potential of the plate 16 and the return of beam 10a to its initial position.

Because of the irregularity in the rate of increase of the translucency of the path 24 and the consequent irregularity in the rate of increase of the potential of the deflecting plate 16, the beam 10a will not move at a constant speed across the mosaic 8 but at a speed varying in accordance with the pattern of the key 20. Movement of the beam 10a across the mosaic results, in the usual way, in the erasing of the electrostatic record formed on the mosaic and the conversion of that record into an electric wave which passes through the wire 29. This electric wave, however, because of the irregular speed of conversion of the record is of a variable frequency governed by the periodically repeated pattern of the key 20.

The wave of variable frequency is fed to an amplifier and modulator 31 where it is used to modulate a carrier wave adapted to be reflected by the object whose distance is to be measured, for example a carrier wave with a wave length of the order of about 10 centimetres. The carrier wave so modulated is emitted, usually in the form of a beam, from the antenna 32, precautions being taken to prevent the emitted wave from being picked up directly by the receiving antenna 33.

The period of repetition of the pattern according to which the frequency of the wave of constant frequency is varied, that is, the period within which one complete circuit of the key and thus one complete transverse and return across the mosaic 8 by the beam 10a is made, is preferably so chosen that within it electric waves will travel at least the maximum distance which is likely to be measured. Thus, for example, where the method and apparatus is used for the determination of the distance of aircraft from a point on the ground, the period of repetition of the pattern might suitably be $1/10,000$ of a second, since in this period electric waves traveling at 300,000 kilometers a second would travel 30 kilometers.

The modulated carrier wave reflected from the object whose distance is to be measured is picked up at the receiving antenna 33 and passed thence through a demodulator and amplifier 34 whence the received wave of variable frequency identical with the erasing wave at the emitter passes through a wire 35 to a modulating electrode 36 for controlling the intensity of an electron beam 37a produced by an electron gun 37 in a pocket in the tube 6. The beam 37a scans a plate 38 similar to the plate 7 in the tube 5 at a speed which varies according to a pattern identical with that according to which the speed of scanning of the beam 10a in the tube 5 is varied and in a manner similar to that described in connection with the tube 5. The scanning of the plate 38 by the beam 37a results in the formation of an electrostatic record on a mosaic 39 similar to the mosaic 8. Thus, the received wave of variable frequency is recorded on the mosaic 39 but in a distorted form as a result of the variable scanning speed of the beam 37a. The scanning movements of this beam are governed by an arrangement similar to that which governs the scanning movements of the beam 10a. One of the deflecting plates 40 is grounded and the other plate 41 is connected to the cathode 42 of a photoelectric cell 43 similar to the cell 18. Associated with the cell 43 is a cathode ray oscillograph 44 having a fluorescent screen 45 and in which an electron beam 44a moves in a circular path synchronously with beam 19a in the oscillograph 19, the movements of both beams being controlled by the same oscillator 22. The light from the rotating luminous spot produced by the action of the beam 44a on the fluorescent coating 45 passes through the path 24 of variable translucency on the key plate 23 described above, and is focused by a lens 46 on the cathode 42.

If the period of scanning as indicated above is 1/10,000 of a second and the distance of the object to be measured is 15 kilometres then, disregarding for the moment any lag which may be introduced in the devices 31 and 34, an electric wave corresponding to that which left the signal plate 8b in the tube 5 at the beginning of one traverse of the mosaic 8 by the beam 10a will reach the modulating electrode 36 just one full scanning period later. Consequently, if the beam 37a is scanning exactly in step with the beam 10a and is thus just about to begin a traverse of the plate 38, the electrostatic record formed on the mosaic 39 will be of a wave of constant frequency identical with that produced by the oscillator 12. This will be apparent from a consideration of a simple example, the values mentioned being taken simply for purposes of explanation and having no relation to actuality. Suppose that the total time required for the beam 10a to traverse the mosaic 8 from the bottom to the top is one second and that one traverse of the plate 7 by the beam 9a results in the recording on the mosaic 8 of twelve complete cycles. If the beam 10a traversed the mosaic at a constant rate, the frequency of the erasing wave would be twelve cycles per second. Assume, however, that the beam 10a covers the lower half of the mosaic in 1/4 of a second but takes 3/4 of a second to traverse the upper half. It thus erases the record of six cycles in the first quarter of a second so that the frequency of the electric wave passing through the wire 29 for the first quarter of a second is twenty-four cycles per second. In each of the last three quarters of a second the beam erases the record of only two cycles so that the frequency of the electric wave passing through the wire 29 for the last three quarters of a second is only 8 cycles per second. Now assume that the beam 37a is moving at exactly the same variable rate of speed as the beam 10a and that it accordingly traverses the lower half of the plate 38 in 1/4 of a second and the upper half in 3/4 of a second. If, just as it is about to begin to traverse the plate 38, the front of an electric wave corresponding to that produced during the traverse just described of the mosaic 8 by the beam 10a reaches the modulating electrode 36, the result will be that during the first quarter of a second the intensity of the beam 37a will go through six cycles of variation. Consequently there will be formed on the lower half of the mosaic 39 a record of six cycles. During the next three quarters of a second the intensity of the beam 37a will likewise go through six cycles of variation, so that there will be formed on the upper half of the mosaic 36 a record also of six cycles. The complete record on the mosaic will thus be identical with the record which was erased from the mosaic 8.

If a given wave is not applied to the modulating electrode 36 at a time when the beam 37a is performing a part of its travel corresponding to the part of the travel which was being performed by the beam 10a when a wave corresponding to this wave was being produced, then the wave of constant frequency which was recorded on the mosaic 8 will not be reconstituted on the mosaic 39. For example, in the specific case discussed above, if the front of a wave corresponding to the front of the wave produced during the described traverse of the mosaic 8 by the beam 10a were to reach the modulating electrode 36 1/4 second after the front of the wave to which it corresponds had left the signal plate 8b, and the beam 37a were scanning exactly in step with the beam 10a, the former would already have traversed the lower half of the plate 38 and would be about to begin the slow part of its traverse. In the next quarter of a second, during which it would traverse only one-sixth of the total length of the plate 38, its intensity would go through six cycles of variation and consequently a record of six cycles would be made on one-sixth of the length of the mosaic 39. During each of the next two quarters of a second the intensity of the beam 37a would go through two cycles of variation, and consequently two cycles would be recorded on each of the upper two sixths of the length of the mosaic 39. If the resultant record were scanned at a constant speed the resultant electric wave would be of variable frequency.

If, however, the key plate 23 were turned through an angle of 90° with respect to the key plate 20, then the beam 37a would start its traverse of the plate 38 1/4 second later than the beam 10a started its traverse of the mosaic 8. Consequently, the beginning of the traverse of the plate 38 by the beam 37a would, in the example just discussed, coincide with the arrival at the modulating electrode 36 of the front of the electric wave generated during the first quarter of a second of the movement of the beam 10a, so that the record formed on the mosaic 39 would be of a wave of the same constant frequency as that generated by the oscillator 12.

As shown in the drawing the key plate 23 is associated with a scale 47, the key plate having a pointer in the form of an appropriate mark 48, preferably opposite the point 25 on the path 24. The scale is fixed in such an angular position that when the distance from the point to the object whose distance to be measured is zero, that is, for example, when the antenna 33 picks up directly the emission from the antenna 32, the angular position of the key plate which will result in the formation on the mosaic 39 of a record of a wave identical with that produced by the oscillator 12 brings the pointer 48 opposite the zero point on the scale. Now assuming the apparatus to have been so-calibrated and the scanning period to be 1/10,000 of a second, then if the distance of the object to be measured is either exactly 15 kilometers or exactly 30 kilometers, the record of the wave of constant frequency will be produced on the mosaic 39 without any angular movement of the key plate 23 because in the first case the time required for the travel of the electric wave from the antenna 32 to the object and back to the antenna 33 is exactly one scanning period and in the second case exactly two scanning periods. If, however, the distance of the object is 7 1/2 kilometers, then the time required for the wave to travel from the emitting antenna 32 to the object and back to the receiving antenna 33 will be only one half the scanning period. Consequently in order to produce on the mosaic 39 a record of the wave of constant frequency, the incidence of the periodically repeated pattern of the key 23 on the received wave would have to be shifted by turning the key plate through 180° so as to cause the beam 37a to begin its traverse of the plate 38 one half a period later than the beam 10a begins its traverse of the mosaic 8.

The electrostatic record formed on the mosaic 39 is scanned periodically by a beam 49a from an electron gun 49, this being moved exactly in step with the scanning of the plate 7 by the beam 9a. The scanning by the beam 49a erases the electrostatic record from the mosaic 39 and converts it into an electric wave which passes from the signal plate 39a through a wire 50 to a band pass filter 51, which is designed to permit the passage only of a constant frequency wave identical with that produced by the oscillator 12. In the simplest form of apparatus the band pass filter might be connected to some device for rendering audible or visible current passing to it. The device might, for example, be a pair of headphones and the key plate 23 could be provided with a handle to permit of its manual rotation. The operator would then turn the key plate 23 until he heard a signal in this headphone indicating that the erasing wave produced by the action of the beam 49a had become a reproduction of the original wave of constant frequency. By observing the position of the pointer 48 on the scale 47 he could read off the distance of the object.

A rather more practical form of apparatus, however, is that shown. In this apparatus the band pass filter 51 is connected by a wire 52 through an amplifier 53 to a gas or vapour lamp 54 having the characteristic of lighting instantaneously on the passage of current through it and being extinguished instantaneously when the current stops. The scale 47 is stationary and is in the form of an annular dial surrounding the key plate 23 and graduated, in the example shown, into fifteen main divisions each with twenty subdivisions, the main divisions indicating kilometers and each subdivision a distance of 50 meters. The key plate 23 is rotated by a motor 55 at a comparatively low speed, for instance sixteen revolutions per second, so that assuming the scanning period to be 1/10,000 of a second, the luminous spot on the fluorescent screen makes slightly more than two complete revolutions while the pointer 48 moves through one subdivision on the scale 47. Once during each revolution, the key plate must necessarily be at such an angular position as to cause the formation on the mosaic 39 of a record of the wave of constant frequency and thus to result in the lighting of the lamp 54. When the lamp lights it illuminates the face of the scale, which is kept otherwise in darkness, and shows the pointer 48 at a particular position on that scale. As soon as the key plate passes the appropriate angular position for the formation of a record of the constant frequency on the mosaic 39 the lamp 54 goes out but is lighted again when, during the next revolution, the key plate 23 reaches the same place if the object has not moved, or a slightly different place if the object has moved.

If the plate 23 revolves at least about 15 times a second, the scale and pointer appear by persistance of vision to be constantly illuminated, a stroboscopic effect being obtained. In order to prevent the light of the lamp 54 from affecting the photoelectric cell 43 a screen 56 may be provided between the lamp and the cell which is opaque to light of the wave length of that provided by the lamp but is transparent to light of the wave length of that produced by the action of the electron beam 44a on the fluorescent coating 45 of the cathode ray oscillograph 44.

If the device described is used for anti-aircraft range finding and there are two aircraft at different distances in the path of the beam emitted from the antenna 32, so that the beam is reflected partly from one and partly from the other, then two received waves out of phase with each other will be applied to the modulating electrode 36. However, once during each revolution of the key plate 23, the beam 37a will first have a lag with respect to the beam 19a appropriate to the distance of the nearest aircraft and will thus cause the formation of a record of the constant frequency wave from the received wave from that aircraft, and will later have a lag appropriate to the distance of a second aircraft and will similarly cause the formation of a record of the wave of constant frequency from the received wave from the second aircraft. Consequently the lamp 54 will light twice during a single revolution of the plate 23 so that the observer will see two images of the pointer 48 pointing to two different places on the scale 47.

If a single apparatus of the type illustrated did not give the requisite accuracy two such apparatuses could be used together. In the first, the scanning period might be for example 1/5,000 of a second and the scale divided thus into 30 divisions each indicating a kilometer. In the second apparatus the scanning period might for example be 1/500,000 of a second and the scale divided into, say, 100 divisions. The first apparatus would thus give a gross indication of the distance in kilometers of the object, and the second apparatus would give an accurate indication to the nearest 10 meters of the distance of the object in any one kilometer. The first apparatus would be necessary since without it it would be impossible to tell from the second apparatus whether the distance were, for instance, 5 kilometers, 650 meters or 8 kilometers, 650 meters, since the second apparatus would give an indication only of 650 meters.

Since, with the method and apparatus of the invention, only one electric wave of constant frequency is being dealt with throughout and there are no problems of synchronization between emitting and receiving apparatus a filter with a very narrow range of response can be used at the receiver, so that the measurements of distance obtained can be very accurate by comparison with those obtainable by the use of prior systems.

What I claim as my invention is:

1. The method of measuring the distance from a given point to a given object, which comprises varying the frequency of an electric wave of constant frequency according to a periodically repeated pattern, modulating with the wave of variable frequency a carrier wave adapted to be reflected by said object, emitting the modulated carrier wave from said point, receiving at said point the wave reflected by said object, demodulating the reflected carrier wave, varying the frequency of the received wave of variable frequency according to a repeated pattern the reverse of the first pattern but having the same period of repetition, shifting the incidence on the received wave of said reverse pattern until the wave of constant frequency is reconstituted, and measuring the shift from the incidence appropriate for a distance of zero from the point to the object.

2. The method as defined in claim 1, in which the period of repetition of the pattern is greater than that required for electric waves to travel the maximum distance whose measurement is likely to be required.

3. The method of measuring the distance from a given point to a given object, which comprises recording a wave of constant frequency, converting the record so formed into an electric wave of variable frequency at a speed which varies according to a periodically repeated pattern, modulating with the wave of variable frequency a carrier wave adapted to be reflected by said object, emitting the modulated carrier wave from said point, receiving at said point the wave reflected by said object, demodulating the reflected carrier wave, recording the received wave of variable frequency at a speed which varies according to a periodically repeated pattern identical with the first pattern, converting the record so formed into another electric wave, shifting the incidence on the received wave of the second mentioned pattern until said other electric wave becomes a reproduction of said wave of constant frequency, and measuring the shift from the incidence appropriate for a distance of zero between the point and the object.

4. The method as defined in claim 3, in which the period of repetition of the pattern is greater than that required for electric waves to travel the maximum distance whose measurement is likely to be required.

5. The method as defined in claim 3, in which the recording of each wave is effected by modulating an electron releasing beam with the wave to be recorded and causing the modulated beam to scan a mosaic to form an electrostatic record of the wave thereon, and the conversion of each record into an electric wave is effected by causing a beam of electrons of constant intensity to scan the mosaic on which the record is formed.

6. Apparatus for measuring the distance from a given point to a given object, which comprises means for varying the frequency of an electric wave of constant frequency according to a periodically repeated pattern, means for modulating with the wave of variable frequency a carrier wave adapted to be reflected by said object, means for emitting the modulated carrier wave from said point, means for receiving at said point the wave reflected by said object, means for demodulating the reflected carrier wave, means for varying the frequency of the received wave of variable frequency according to a repeated pattern the reverse of the first pattern but having the same period of repetition, means for shifting the incidence on the received wave of said reverse pattern until the wave of constant frequency is reconstituted, and means for measuring the shift from the incidence appropriate for a distance of zero between the point and the object.

7. Apparatus for measuring the distance from a given point to a given object, which comprises means for recording a wave of constant frequency, means for converting the record so formed into an electric wave of variable frequency at a speed which varies according to a periodically repeated pattern, means for modulating with the wave of variable frequency a carrier wave adapted to be reflected by said object, means for emitting the modulated carrier wave from said point, means for receiving at said point the wave reflected by said object, means for demodulating the reflected carrier wave, means for recording the received wave of variable frequency at a speed which varies according to a periodically repeated pattern identical with the first mentioned pattern, means for converting the record so formed into another electric wave, means for shifting the incidence on the received wave of the second mentioned pattern until said other electric wave becomes a reproduction of said wave of constant frequency, and means for measuring the shift from the incidence appropriate for a distance of zero between the point and the object.

8. Apparatus for measuring the distance from a given point to a given object, which comprises means for modulating an electron releasing beam with a wave of constant frequency, a mosaic, means for causing the modulated beam to scan said mosaic to form an electrostatic record of the wave thereon, means for causing a beam of electrons of constant intensity to scan the mosaic on which the record is formed at a speed which varies according to a periodically repeated pattern to convert said record into an electric wave of variable frequency, means for modulating with the wave of variable frequency a carrier wave adapted to be reflected by said object, means for emitting the modulated carrier wave from said point, means for receiving at said point the wave reflected by said object, means for demodulating the reflected carrier wave, means for modulating another electron releasing beam with the received wave of variable frequency, another mosaic, means for causing the last mentioned modulated beam to scan said other mosaic at a speed which varies according to a periodically repeated pattern identical with the first mentioned pattern to form a record on said other mosaic of the received wave of variable frequency, means for causing a beam of electrons of constant intensity to scan said other mosaic to convert the record so formed into another electric wave, means for shifting the incidence on the received wave of the second mentioned pattern until said other electric wave becomes a reproduction of said wave of constant frequency, and means for measuring the shift from the incidence appropriate for a distance of zero between the point and the object.

9. Apparatus as defined in claim 8, comprising at least one pair of deflecting plates for controlling the scanning movements of the beam of electrons for converting into a wave of variable frequency the electrostatic record of the wave of constant frequency, at least one pair of deflecting plates for controlling the scanning movements of the electron releasing beam modulated with the received wave of variable frequency, a photoelectric cell having its output connected to one plate of the first mentioned pair, a photoelectric cell having its output connected to one plate of the second mentioned pair, and means for directing on each photoelectric cell light which repeatedly increases at an irregular rate from a minimum to a maximum and then sharply decreases to said minimum.

10. Apparatus as defined in claim 8, comprising at least one pair of deflecting plates for controlling the scanning movements of the beam of electrons for converting into a wave of variable frequency the electrostatic record of the wave of constant frequency, at least one pair of deflecting plates for controlling the scanning movements of the electron releasing beam modulated with the received wave of variable frequency, a photoelectric cell having its output connected to one plate of the first mentioned pair, a photoelectric cell having its output connected to one plate of the second mentioned pair, a cathode ray oscillograph associated with each photoelectric cell with its fluorescent screen facing said cell, means for scanning the fluorescent screen of each oscillograph in a circular path by a beam of electrons, and a plate interposed between the cell and the fluorescent screen and having thereon a corresponding circular path the translucency of which increases at an irregular rate from a minimum to a maximum over an arc of somewhat less than 360° and then sharply decreases to the minimum.

11. Apparatus as defined in claim 8, comprising at least one pair of deflecting plates for controlling the scanning movements of the beam of electrons for converting into a wave of variable frequency the electrostatic record of the wave of constant frequency, at least one pair of deflecting plates for controlling the scanning movements of the electron releasing beam modulated with the received wave of variable frequency, a photoelectric cell having its output connected to one plate of the first mentioned pair, a photoelectric cell having its output connected to one plate of the second mentioned pair, a cathode ray oscillograph associated with each photoelectric cell with its fluorescent screen facing said cell, means for scanning the fluorescent screen of each oscillograph in a circular path by a beam of electrons, a plate interposed between the cell and the fluorescent screen and having thereon a corresponding circular path the translucency of which increases at an irregular rate from a minimum to a maximum over an arc of somewhat less than 360° and then sharply decreases to the minimum, means for continuously revolving the plate associated with the photoelectric cell connected to a deflecting plate for the electron beam modulated with the received wave, a fixed scale surrounding said plate, a pointer on said plate cooperating with the scale, a gas or vapour lamp adapted when lit to illuminate said scale and pointer, and means for feeding current to said lamp only when the electric wave formed by the conversion of the record of the received wave is a reproduction of the wave of constant frequency.

FRANÇOIS CHARLES
PIERRE HENROTEAU.

REFERENCES CITED

The following references are of record in the file of this patent:

UNITED STATES PATENTS

| Number | Name | Date |
|---|---|---|
| 2,247,662 | Newhouse | July 1, 1941 |
| 2,261,272 | Newhouse | Nov. 4, 1941 |
| 2,098,287 | Gent | Nov. 9, 1937 |